(12) United States Patent
Ma et al.

(10) Patent No.: US 7,908,375 B2
(45) Date of Patent: Mar. 15, 2011

(54) TRANSPARENTLY EXTERNALIZING PLUG-IN COMPUTATION TO CLUSTER

(75) Inventors: Tianchi Ma, Shanghai (CN); Jun Su, Shanghai (CN); Mingqiang Xu, Bothell, WA (US); Yun Jin, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 680 days.

(21) Appl. No.: 11/776,229

(22) Filed: Jul. 11, 2007

(65) Prior Publication Data

US 2009/0019159 A1    Jan. 15, 2009

(51) Int. Cl.
*G06F 15/173* (2006.01)
(52) U.S. Cl. .......................... 709/226; 709/223; 709/250
(58) Field of Classification Search .................... 709/226
See application file for complete search history.

(56) References Cited

U.S. PATENT DOCUMENTS

| 7,191,290 | B1 * | 3/2007 | Ackaouy et al. .............. 711/119 |
| 7,325,027 | B2 * | 1/2008 | Grow et al. .................... 709/201 |
| 7,356,679 | B1 * | 4/2008 | Le et al. ............................. 713/1 |
| 7,380,039 | B2 * | 5/2008 | Miloushev et al. ........... 710/244 |
| 7,631,107 | B2 * | 12/2009 | Pandya ........................ 709/250 |
| 7,676,816 | B2 * | 3/2010 | Brunswig et al. ............. 719/330 |
| 2002/0184321 | A1 * | 12/2002 | Fishman et al. .............. 709/206 |
| 2003/0028889 | A1 * | 2/2003 | McCoskey et al. ............. 725/91 |
| 2003/0093572 | A1 * | 5/2003 | Laux et al. .................... 709/250 |
| 2004/0019693 | A1 * | 1/2004 | Grow et al. ................... 709/232 |
| 2004/0076397 | A1 * | 4/2004 | Kawahara ........................ 386/35 |
| 2004/0133886 | A1 * | 7/2004 | Wu ................................. 717/154 |
| 2006/0069791 | A1 * | 3/2006 | Patrick et al. ................. 709/230 |
| 2006/0143350 | A1 * | 6/2006 | Miloushev et al. ........... 710/242 |
| 2007/0124380 | A1 * | 5/2007 | Carr et al. ..................... 709/204 |
| 2008/0091806 | A1 * | 4/2008 | Shen et al. .................... 709/223 |
| 2008/0133755 | A1 * | 6/2008 | Pollack ......................... 709/226 |
| 2009/0228898 | A1 * | 9/2009 | Aveyard et al. ............... 719/314 |

* cited by examiner

*Primary Examiner* — Firmin Backer
*Assistant Examiner* — Hamza Algibhah
(74) *Attorney, Agent, or Firm* — Senniger Powers LLP (57) ABSTRACT

External processing of a request directed to an external software program from an invocation source to a cluster of computing devices. A wrapper tool is provided for processing the request from the invocation source. The request includes operations to be performed by the external software program on the host computer. The wrapper tool intercepted the request and extracts information included in the intercepted request. The extracted information is transmitted to a cluster scheduler. The cluster scheduler identifies a set of computing devices in the cluster of computing devices for processing the request. The identified set of computing devices processes the intercepted request as a function of the intercepted request, the information and the invocation source. A result is provided in response to the processed request from the identified set of computing devices to the invocation source.

16 Claims, 4 Drawing Sheets

TRANSPARENTLY EXTERNALIZING PLUG-IN COMPUTATION TO CLUSTER

BACKGROUND

Plug-ins applications or external software programs perform significant roles in enhancing user experience with a host application. The plug-in applications or external software programs interact with the host application and provide additional features or more specialized solutions to the general functions available in the host application. For example, a plug-in application or an external software program to a browser application may enable the browser application display or render a particular type of file (e.g., a media file) or the like.

In using the plug-in application, the host application frequently uses a "invoking iteratively" calling convention in calling the plug-in application. Application following this convention will finish a bunch of homogeneous problems in a single calculate activity. The plug-ins will be invoked once for each of the problem.

For example, a financial analyzer may wish to recalculate a spreadsheet with 1500 rows. Each row represents a risk evaluation of a single portfolio unit. The risk evaluation will be performed by a third party plug-in's executable library. However, invoking this kind of third party function is likely to take a long time. In the above example, two to three seconds are needed for a personal computer (PC) to calculate a single risk evaluation which has 15000 Monte-Carlo simulations. That means the total time for calculating the 2000 rows would be about 4000 to 6000 seconds, which is more than one hour.

Currently, plug-ins are typically implemented as shared libraries that must be installed in a place prescribed by the main application. As such, in solving the problem described above, multi-threading is proposed as a solution to the problem. A computer with several CPUs or a CPU that has several cores can start a couple of threads to perform the simulations at the same time. However, the number of processors or cores of a processor of a computer could have is limited, and it is inefficient or unpractical to rely on a solution based on the number of processors alone.

The second approach involves redesigning the plug-in applications in a cluster-enabled or distributed computing environment as most of the applications are designed for only single thread execution. As such, current practices have required the developer to manually modify the plug-ins or/and the hosting application, then recompile/rebuild for the specific usage. The second type of practices involve requiring the user to change their behavior and operating style, such as to change user-defined functions (e.g., myfunction (a,b)) to different functions (e.g., cluster_run("myfunction", new object[2]{a,b})) that are able to take advantage of the processing powers of the cluster of the computing devices.

These two practices suffer from the source level modification limits since only the developer of hosting applications and plug-ins will have their source code. The user level modification is also unacceptable, since user has to reformat or reconfigured the user's codes and data to adapt to the cluster execution.

SUMMARY

Embodiments of the invention enable a plug-in application or an external software program user to receive the advantages of the cluster computing without the cumbersome and daunting tasks of modifying user-defined functions or the plug-in by providing a wrapper tool that intercepts the plug-in calls directed to the plug-in applications. Aspects of the invention provide a non-manual-intervene computation parallelization so that users can externalize a plug-ins to cluster by simply in turns running the tools. There is no need to have any source code of the hosting application or the plug-ins. In addition, aspects of the invention transparently break out the single thread-based invocation into "client-multiple service" style, without changing of any existing source code or user behavior. Furthermore, the user experience is improved as embodiments of the invention externalize the calculation of user defined functions in a spreadsheet onto the cluster and without any change on user's spreadsheet.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
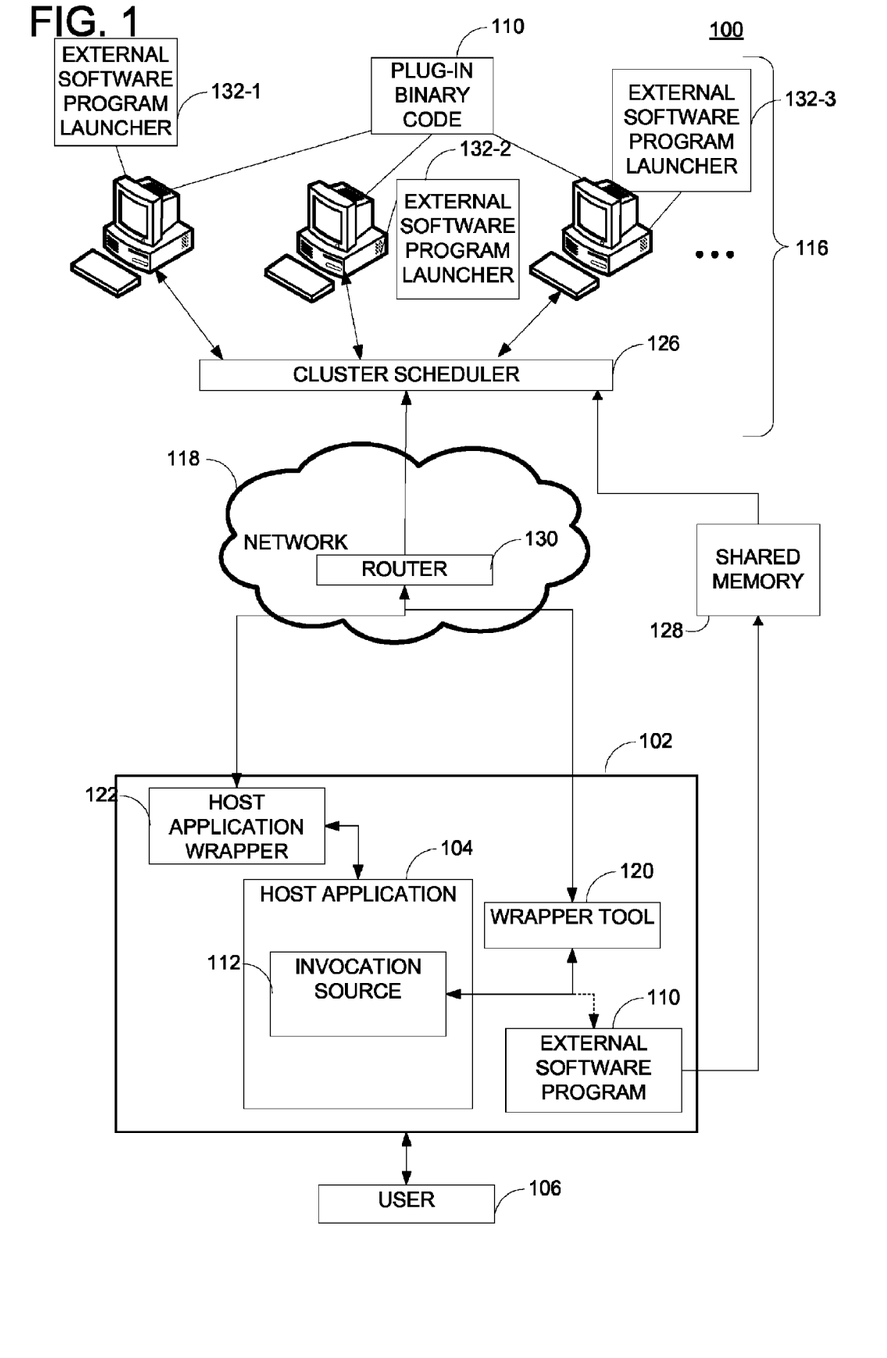
FIG. 1 is a diagram illustrating an exemplary embodiment of a system for external processing of a request directed to an external software program originating from an invocation source to a cluster of computing devices according to an embodiment of the invention.

Embodiments of the invention enable processing of plug-in applications or external software programs by a cluster of computing devices. Referring now to FIG. 1, a diagram illustrates an exemplary embodiment of a system 100 for external processing of a request directed to an external software program originating from an invocation source to a cluster of computing devices according to an embodiment of the invention. The system 100 includes at least a host computer 102 having a memory area and a processing unit (not shown) for processing or executing a host application 104. For example, the host computer 102 may a computing device such as a personal computer (PC), a workstation computer, a personal digital assistance (PDA), a cellular phone, a Smartphone, or other portable computing devices.

The host computer 102 typically has at least some form of computer readable media. Computer readable media, which include both volatile and nonvolatile media, removable and non-removable media, may be any available medium that may be accessed by host computer 102. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by host computer 102. Wired media, such as a wired network or direct-wired connection, and wireless media, such as acoustic, RF, infrared, and other wireless media, are examples of communication media. Combinations of any of the above are also included within the scope of computer readable media.

The memory area of the host computer 102 also includes computer storage media in the form of removable and/or non-removable, volatile and/or nonvolatile memory. It is known that the memory area may include read only memory (ROM) and random access memory (RAM). A basic input/output system (BIOS), containing the basic routines that help to transfer information between elements within host computer 102, such as during start-up, is typically stored in ROM. RAM typically contains data and/or program modules that are immediately accessible to and/or presently being operated on by processing unit.

The host computer 102 may also include other removable/non-removable, volatile/nonvolatile computer storage media. For example, the host computer 102 may also include a magnetic disk drive that reads from or writes to a removable, nonvolatile magnetic disk, and an optical disk drive that reads from or writes to a removable, nonvolatile optical disk such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive, and magnetic disk drive and optical disk drive are typically connected to the system bus by a non-volatile memory interface, such as interface.

In one embodiment, the host application 104 is a software program executable by the processing unit of the host computer 102. For example, the host application 104 may be any software program, executable programming module, application, application programs, or the like. A user 106 may use the host application 104 to perform a number of functions, such as creating, opening or editing text documents, browsing network resources or documents, creating, opening or editing spreadsheet documents.

For example, embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

The system 100 also includes an external software program 110 and it is external or auxiliary with respect to the host application 104. For example, the external software program 110 may provide additional features, specific features, specific functionalities, or the like to the host application 104. In one embodiment, the external software program 110 is a plug-in, add-on, add-in application, or dynamic link libraries (DLL), or other library files with a collection of subprograms that provides functionalities to the host application 104.

In one example, the user may use the host application 104 to access a spreadsheet document 112. The spreadsheet document 112 includes an invocation source (hereinafter spreadsheet document and the invocation source are collectively referred to as "the invocation source 112") 112, which may be a cell within the spreadsheet document. It is to be understood that other types of documents may be used without departing from the scope of embodiments of the invention. For example, a hypertext markup language (HTML) document may include an invocation source, such as a link, to invoke or call the external software program 110.

Still referring to FIG. 1, the user 106 uses the host application 104 to perform various functions to the invocation source 112. When the user 106 wishes to request the functionalities or features available on the external software program 110, the user 106 invokes the external software program 110 from the host application 104. The external software program 110 processes the request and returns the result to the host application 104. The host computer 102 dedicates its processing resources during the execution of the external software program 110. As such, if the request and the calculation are demanding, the host computer 102 may experience significant operational set backs. One approach to solve this problem is to use a cluster of computing devices 116 to process the request via a network 118.

For example, as computer clusters becoming more available, the cluster of computing devices 116 spread intensive calculations onto a cluster of computers, which includes a set of PCs or workstations connected through ordinary network. The cluster of computing devices 116 provide applications which "invoking iteratively" a linear increase in speed, based on the amount of nodes invoked. For example, if n nodes are used in calculating the spreadsheet simultaneously, the total time will reduce to 1/n. The working mechanism includes having each allocated computer node on the cluster run 1/n number of total tasks. A dispatcher or scheduler 126 will coordinate among the hosting application and computer nodes in the cluster and will be responsible for balancing the workload among computer nodes.

While this approach appears to be promising, modifying of the external software program 110 is typically required if the user 106 wishes take advantages of the processing power of the cluster of computing devices 116. However, the user 106 is discouraged from taking such an approach because the source code of the external software program 110 is usually unavailable. In addition, the user 106 is also likely required to modify any functions or codes that are defined by the user 106 as part of the invocation source 112. For example, the user 106 may have created user-defined functions within the invocation source 112 or the document. Consequently, the user-defined functions may be not be operational or return incorrect values that may require additional checking of the invocation source 112 or the document by the user 106.

Figure 2:
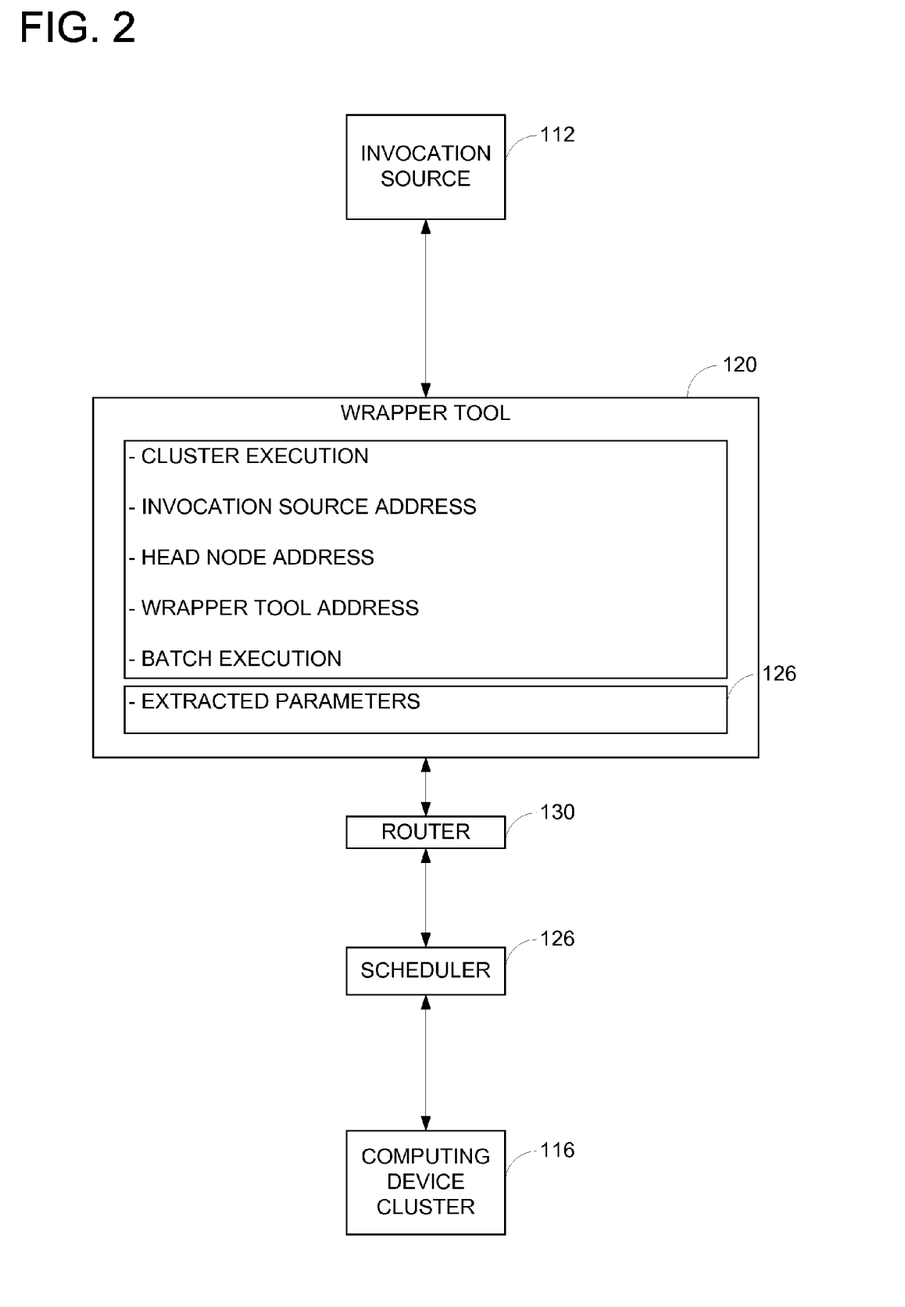
FIG. 2 is a diagram illustrating an implementation of a wrapper tool according to an embodiment of the invention.

Embodiments of the invention overcome at least the two deficiencies above by creating or providing a wrapper tool 120. Referring now to FIG. 2, a diagram illustrates an implementation of the wrapper tool 120 according to an embodiment of the invention. In one embodiment, the wrapper tool 120 includes codes, libraries, computer-executable components that interface between the external software program 110 and the cluster of computing devices 116 for the purpose of processing the request from the invocation source 112. In one embodiment, the wrapper tool 120 intercepts the request from the user 106 directed for the external software program 110 and instead enables the deployment of the external software program 110 to the proper location on cluster computer nodes in the cluster of computing devices 116. For example, the wrapper tool 120 receives or intercepts the request so that the external software program 110 does not receive the request. In this example, the wrapper tool 120 may initially extract the signatures of the to-be-invoked functions from binary codes (such as all managed code assemblies, COM objects and some unmanaged code libraries) of the external software program 110. A hosting application wrapper 122 is obtained and it is deployed on each computer node of the cluster 116. In one embodiment, the hosting application wrapper 122 is a library implementing all the call backs' interface from the external software program 110. It is developed according to the application programming interfaces (APIs) listed in the development document of the external software program 110. The host application wrapper 122 may only need to be developed once for the hosting application 104, and the host application 104 may adapt to every external software program 110 using the host application wrapper 122. In a further embodiment, a copy of the external software program 116 is stored on a shared memory 128 accessible by the cluster 116. The computing devices in the cluster 116 scheduled to process the request retrieve the codes from the shared memory and executed the external software program 110 in order to provide the result to the invocation source 112. In one example, external software program launchers 132 for each computer node in the cluster 116 scheduled to process the request load the external software program 110 for each computer node so that the computer nodes process the request.

In another embodiment, the wrapper tool 120 may generate the codes which implement the identical signature of the original external software program 110. In an alternative embodiment, the newly generated codes may replace the original external software program 110 by the wrapper tool 120 on the host computer 102.

Also, the wrapper tool 120 includes at least the following information: cluster execution, an invocation source address, a head node address, a wrapper tool address, and batch execution. For example, the cluster execution includes information whether cluster execution is enabled. The invocation source address, the head node address, and the wrapper tool 120 address include information relating to the address, which may be physical and/or virtual address, or a combination thereof, of the invocation source, the head node of the cluster 116, and the wrapper tool 120, respectively. In one embodiment, the batch execution indicates to the wrapper tool 120 whether the wrapper tool 120 should batch a collection of calculations from the invocation source 112. Other information may be included without departing from the scope of embodiments of the invention.

Once the wrapper tool 120 intercepted the request, the wrapper tool 120 extracts parameters or other information from the request. For example, the parameters may include (using spreadsheet invocation source as an example) invocation reference identification, cell range, user-defined functions, parameters to the user-defined functions, etc.

As such, embodiments of the invention beneficially provide the processing power of the cluster 116 while the user 106 does not need to modify user-defined functions associated with the invocation source 112.

Figure 3:
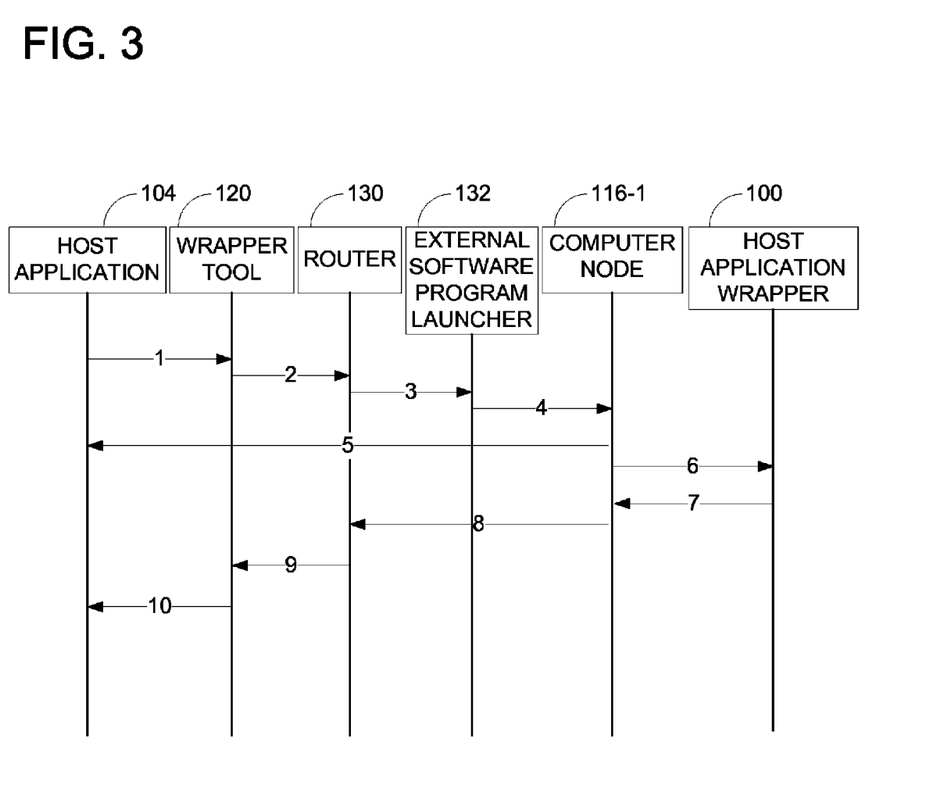
FIG. 3 is a diagram illustrating a typical process flow in system for external processing of a request directed to an external software program originating from an invocation source to a cluster of computing devices according to an embodiment of the invention.

Referring now to FIG. 3 (and also referring to FIG. 1), a diagram illustrates a typical process flow in system for external processing of a request directed to the external software program 110 originating from the invocation source 112 to the cluster of computing devices 116 according to an embodiment of the invention. An arrow 1 indicates when the host application 104 or the invocation source 112 calls or requests a service provided by the external software program 110. The request and/or the invocation are intercepted by the wrapper tool 120. According to an arrow 2, the wrapper external software program 110 packs the request, which includes the extract parameters, cluster information (such as the information described above including cluster execution, the head node address, or the like) and all argument objects and sends the information to a router 130. In one embodiment, the wrapper tool 120 sends the information as a into a Service Oriented Architecture Protocol (SOAP) message.

In one embodiment, on the first time the router 130 receives such message or information, it will contact the cluster scheduler (e.g., a cluster scheduler 202 in FIG. 2) to allocate several computer nodes for this message. In one embodiment, the scheduler 202 is responsible for selecting available computer nodes according to known schedule schemes or scheduling policy. When the nodes are ready, the router 130 will run the external software program 110 launcher on each node according to an arrow 3. In an alternative embodiment, on each time the router 130 receives a message from the wrapper tool 120, the router 130 will choose a computer node and forward the message to the external software program 110 launcher on that node. The node selection is according to certain scheduling policy.

In one embodiment, the external software program 110 is stored on a shared memory area accessible by the computer nodes in the cluster 116. Once the external software program 110 launcher receives the message and properly processes the included information such as the parameters and other information, the computer node(s) responsible for processing the request in the cluster 116 load the necessary external software program 110 from the shared memory area at arrow 4. Once the processing is completed, the computer node in the cluster 116 returns the result of the processing to the invocation source 112 according to an arrow 5.

On the other hand, if the external software program 110 is trying to call back to the host application 104, such as requesting values relating to the invocation source 112 and available on the host application, the computer node in the cluster 116 sends information, including the invocation information and the extract parameters to a hosting application wrapper 122 according to an arrow 6. According to one embodiment, some requests or invocations will be processed locally by the hosting application wrapper 122, while others will be forwarded back to the wrapper tool 120 on the host computer 102 (through arrows 7-10). For example, some information may include information relating to dependencies between the invocation source 112 and the host application 104. The result of this call back will be then sent back to the computer node according arrows 1-4 as described above.

In an alternative embodiment, the result form the computer node to the invocation source 112 may be packed as a SOAP message and returned to the router 130. In such an implementation, the router 130 forwards the returned message back to the wrapper tool 120 and the wrapper tool 120 further transmits the result to the host application 104 and the invocation source 112 to be provided to the user 106.

As the application launches a large amount of threads, the requests are externalized to multiple computer nodes in a cluster, and hence the application gets parallelized. As such, embodiments of the invention transparently break out the single thread based invocation into "client-multiple service" style, without changing of any existing source code or user behavior. In addition, aspects of the invention conveniently externalize the calculation of user-defined functions onto a cluster, without any change on user's document or invocation source.

Figure 4:
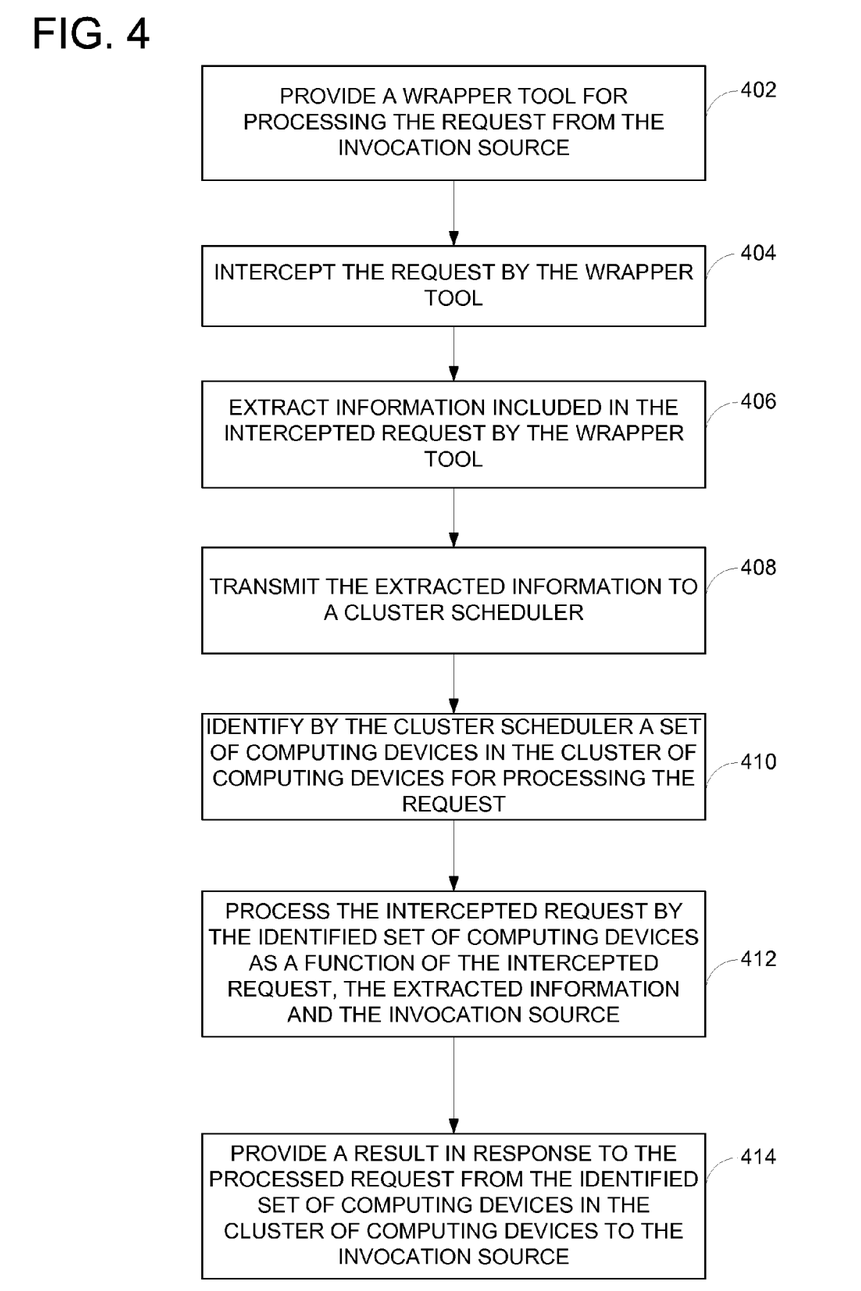
FIG. 4 is a flow diagram illustrating operations of external processing of an external software program according to an embodiment of the invention.

FIG. 4 is a flow diagram illustrating operations of external processing of an external software program according to an embodiment of the invention. At 402, a wrapper tool is provided for processing the request from the invocation source so that the request is not provided to the external software program. The request includes operations to be performed by the external software program (e.g., external software program 110) on the host computer. As described above, the external software program 110 provides additional functionalities to the host application 104 stored on the host computer and the host application 104 operates the invocation source 112. At 404, the request is intercepted by the wrapper tool (e.g., the wrapper tool 130). Information included in the intercepted request is extracted from the request by the wrapper tool 406.

At 408, the extracted information is transmitted to a cluster scheduler (e.g., cluster scheduler 202). In one embodiment, the extracted information is first transmitted to a router (e.g., router 130), and the router 130 transmits the extract information to the scheduler 202. The cluster scheduler identifies a set of computing devices in the cluster of computing devices for processing the request at 410. The identified set of computing devices processes the intercepted request as a function of the intercepted request, the extracted information and the invocation source at 412. By so doing, the host computer 102 does not need to process the request and executes the external software program 110 on the host computer 102. Instead, the cluster of computing devices 116 execute the external software program 110 or codes generated by the wrapper tool 120 that perform the same function as the external software program 110 in handling the request from the invocation source 112. The user 106 is benefited and the user experience is enhanced because the external software program does not require modification to permit the wrapper tool to extract information and to permit the computing devices in the cluster 116 to process the request. At 414, the result is provided in response to the processed request from the identified set of computing devices in the cluster of computing devices to the invocation source.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for external processing by a cluster of computing devices a request originating from an invocation source and intended for execution by an external software program, said invocation source being stored on a host computing device, wherein said cluster of computing devices and said host computer are separate, independent operating devices, said method comprising:

providing a wrapper tool for processing the request from the invocation source so that the request is not provided to the external software program, said wrapper tool implementing a signature identical to the external software program, said request including operations to be performed by the external software program on the host computer, wherein the external software program provides additional functionalities to a host application stored on the host computer, wherein the host application operates the invocation source;

intercepting the request for the external software program by the wrapper tool and preventing the external software program from receiving the request;

extracting information included in the intercepted request by the wrapper tool;

generating, by the wrapper tool, code for performing the function of the external software program for handling the intercepted request;

transmitting the extracted information and the generated code to a cluster scheduler;

identifying by the cluster scheduler a set of computing devices in the cluster of computing devices for processing the request;

processing the intercepted request by the identified set of computing devices by executing the generating code received from the wrapper tool as a function of the intercepted request, the information and the invocation source, said processing further comprising requesting information from the invocation source by the identified set of computing devices, said requested information comprising information relating to dependencies between the invocation source and the host application, wherein a host application wrapper receives the request from the identified set of computing devices, said host application wrapper being different from the wrapper tool, and wherein the host application wrapper processes the request on behalf of the host application without modifying the external software program thereby enabling the wrapper tool to extract information and thereby enabling the identified set of computing devices to process the request; and providing a result in response to the request to the external software program from the identified set of computing devices in the cluster of computing devices to the invocation source.

2. The method of claim 1, wherein the invocation source comprises a cell in a spreadsheet document, and wherein the external software program comprises a plug-in or an add-on application.

3. The method of claim 1, wherein transmitting further comprising transmitting cluster information including at least one of the following: a head node address of the cluster of the computing devices, an address for the wrapper tool, and an identification of the invocation source.

4. The method of claim 1, further comprising formatting the transmitted information in a Service Oriented Architecture Protocol (SOAP) message to a router, wherein the router transmits the SOAP message to the identified a set of computing devices in the cluster of computing devices.

5. The method of claim 1, further comprising storing the external software program on a shared memory area accessible by the cluster of computing devices, and further comprising executing the external software program stored on the shared memory area by the identified set of computing devices in the cluster of computing devices.

6. A system for external processing by a cluster of computing devices requests originating from an invocation source and intended for execution by an external software program, wherein the external software program provides additional functionalities to a host application stored on a host computer, and wherein the host application operates the invocation source, said system comprising:
   an invocation source for issuing a request to be processed by the external software program on a host computer, said invocation source being stored on the host computer and operable by a host application;
   a wrapper tool for intercepting the request from the invocation source intended for the external software program so that the request is not provided to the external software program, wherein the wrapper tool implements a signature identical to the external software program, wherein the wrapper tool extracts information included in the intercepted request, and wherein the wrapper tool generates code for performing the function of the external software program for handling the intercepted request;
   a router for transmitting the extracted information and the generated code from the wrapper tool to a cluster scheduler identifying a set of computing devices in the cluster of computing devices for executing the generated code to process the request; and
   wherein the identified set of computing devices in the cluster of computing devices processes the request as a function of the request, the information and the invocation source and provides a result in response to the processed request from the identified set of computing devices in the cluster of computing devices to the invocation source, wherein the identified set of computing devices is further configured to request information from the invocation source, said requested information comprising information relating to dependencies included in the invocation source and the host application without modifying the external software program thereby enabling the wrapper tool to extract information and thereby enabling the identified set of computing devices to process the request.

7. The system of claim 6, wherein the invocation source comprises a cell in a spreadsheet document, wherein the host application comprises a spreadsheet readable application, and wherein the external software program comprises a plug-in or an add-on application.

8. The system of claim 6, wherein the router is further configured to transmit cluster information including at least one of the following: a head node address of the cluster of the computing devices, an address for the wrapper tool, and an identification of the invocation source.

9. The system of claim 6, wherein the router is further configured to format the extracted information in a Service Oriented Architecture Protocol (SOAP) message before transmitting the SOAP message to the identified a set of computing devices in the cluster of computing devices.

10. The system of claim 6, further comprising a shared memory area accessible by the cluster of computing devices for storing the external software program, and wherein the identified set of computing devices in the cluster of computing devices executes the external software program stored on the shared memory area.

11. The system of claim 6, further comprising a host application wrapper for receiving the request from the identified set of computing devices in the cluster of computing devices, and wherein the host application wrapper processes the request on behalf of the host application.

12. A method for external processing, by a cluster of computing devices, of a request from an invocation source and intended for execution by an external software program, wherein a plug-in application provides additional functionalities to a host application stored on a host computer, wherein the host application operates the invocation source, wherein said cluster of computing devices and said host computer are separate, independent operating devices said method comprising:
   providing a wrapper tool for processing the request from the invocation source so that the request is not provided to the external software program, said wrapper tool implementing a signature identical to the external software program, said request including operations to be performed by the plug-in application on a host computer;
   intercepting the request for the external software program by the wrapper tool and preventing the external software program from receiving the request;
   extracting, by the wrapper tool, information included in the intercepted request by the wrapper tool;
   generating, by the wrapper tool, code for executing the intercepted request;
   transmitting the extracted information and the generated code to a cluster scheduler;
   identifying by the cluster scheduler a set of computing devices in the cluster of computing devices for executing the generated code to process the request;
   executing the generated code for processing the intercepted request by the identified set of computing devices as a function of the intercepted request, the information and the invocation source, said processing further comprising requesting information from the invocation source by the identified set of computing devices, said requested information comprising information relating to dependencies included in the invocation source and the host application, wherein the identified set of computing devices executes the plug-in application stored on the shared memory without modifying the external software program thereby enabling the wrapper tool to extract information and thereby enabling the identified set of computing devices to process the request; and
   providing a result in response to the processed request from the identified set of computing devices in the cluster of computing devices to the invocation source.

13. The method of claim 12, wherein the invocation source comprises a cell in a spreadsheet document, and wherein the host application comprises a spreadsheet readable application.

14. The method of claim 12, wherein transmitting further comprising transmitting cluster information including at least one of the following: a head node address of the cluster of the computing devices, an address for the wrapper tool, and an identification of the invocation source.

15. The method of claim 12, further comprising formatting the extracted information in a Service Oriented Architecture Protocol (SOAP) message before transmitting the SOAP message to the identified a set of computing devices in the cluster of computing devices.

16. The method of claim 12, further comprising a host application wrapper for receiving the request from the identified set of computing devices in the cluster of computing devices, and wherein the host application wrapper processes the request on behalf of the host application.

* * * * *